(12) United States Patent
Lahoda et al.

(10) Patent No.: US 7,261,874 B2
(45) Date of Patent: Aug. 28, 2007

(54) GAS PHASE ELECTROLYZER PROCESS FOR PRODUCING HYDROGEN

(75) Inventors: Edward J. Lahoda, Pittsburgh, PA (US); Keith D. Task, Pittsburgh, PA (US)

(73) Assignee: Westinghouse Electric Co. LLC, Pittsburgh, PA (US)

( * ) Notice: Subject to any disclaimer, the term of this patent is extended or adjusted under 35 U.S.C. 154(b) by 0 days.

(21) Appl. No.: 11/145,320

(22) Filed: Jun. 3, 2005

(65) Prior Publication Data

US 2006/0275197 A1 Dec. 7, 2006

(51) Int. Cl.
*C01B 3/04* (2006.01)
(52) U.S. Cl. ............... 423/648.1; 204/174; 204/520; 423/542; 423/539
(58) Field of Classification Search ........... 423/648.1, 423/639, 542; 204/174, 520
See application file for complete search history.

(56) References Cited

U.S. PATENT DOCUMENTS

| | | | | |
|---|---|---|---|---|
| 3,888,750 | A | * | 6/1975 | Brecher et al. ............ 423/539 |
| 4,059,418 | A | * | 11/1977 | Cull ............................ 95/137 |
| 4,244,794 | A | * | 1/1981 | Hollabaugh et al. ........ 205/554 |
| 4,332,650 | A | * | 6/1982 | Foh et al. .................... 205/338 |
| 4,351,806 | A | * | 9/1982 | Galloway ..................... 422/206 |
| 4,412,895 | A | * | 11/1983 | Lu ................................ 205/637 |
| 4,609,539 | A | * | 9/1986 | Horecky et al. ........ 423/244.09 |
| 5,409,524 | A | * | 4/1995 | Jensvold et al. ................ 96/8 |
| 6,505,683 | B2 | * | 1/2003 | Minkkinen et al. ......... 166/266 |
| 6,602,324 | B2 | * | 8/2003 | Stein et al. ..................... 95/54 |

OTHER PUBLICATIONS

John E. Goosen et al. "Improvements in the Westinghouse Process for Hydrogen Production" American Nuclear Society Global Paper #88017, American Nuclear Society Annual Winter Meeting, New Orleans, Louisiana, USA, Nov. 2003.*
Edward J. Lahoda et al. "Nuclear Energy in Non-Electric Power Applications" 11th International Conference on Nuclear Engineering, Tokyo, Japan, Apr. 20-23, 2003. ICONE11-36559.
Edward J. Lahoda et al. "Optimization of the Westinghouse Sulfur Process for Hydrogen Generation and the Interface with an HTGR" Proceedings of the 12th International Conference on Nuclear Engineering. Apr. 25-29, 2004, Arlington, Virginia, USA. ICONE12-49031.
Regis Matzie et al. "Interfacing the Westinghouse Sulfur Cycle with the PBMR for the Production of Hydrogen" AIChE, New Orleans, Louisiana, USA, Apr. 2004.
Westinghouse Electric Corporation "Hydrogen Production Using Electrolysis Versus a Hybrid Cycle" EPRI EM-789, Project 1086-2, Final Report, Jun. 1978, South Large, Pennsylvania, USA.

(Continued)

*Primary Examiner*—Steven Bos
*Assistant Examiner*—Paul Wartalowicz

(57) ABSTRACT

The invention provides a method for a sulfur based hydrogen production cycle wherein the sulfur products are maintained in a gaseous state throughout the cycle. The cycle includes a decomposition of a gaseous phase sulfur trioxide to sulfur dioxide and water in a decomposition reactor and an oxidation of gaseous sulfur trioxide with $H_2O$ in an electrolyzer to form sulfur trioxide and hydrogen. Costs are reduced by elimination of energy costs previous necessary to convert the sulfuric products from liquid to gas and back again and by extending the lifespan of decomposition catalysts through the elimination of water in an $SO_2/SO_3$ stream.

21 Claims, 3 Drawing Sheets

OTHER PUBLICATIONS

G. H. Farbman "The Conceptual Design of an Integrated Nuclear Hydrogen Production Plant Using the Sulfur Cycle Water Decomposition System" Westinghouse Electric Corporation Astronuclear Lab, Apr. 1976, Pittsburgh, Pennsylvania, USA.

G. H. Farbman et al. "Hydrogen Generation Process" Westinghouse Electronic Corporation Advanced Energy Systems Division. Jun. 1977, Pittsburgh, Pennsylvania, USA.

* cited by examiner

GAS PHASE ELECTROLYZER PROCESS FOR PRODUCING HYDROGEN

FIELD OF THE INVENTION

The present invention generally relates to a sulfur based method for producing hydrogen, wherein the hydrogen can be used for a variety of uses including transportation fuel, chemicals manufacture and energy storage. Specifically, the invention relates to a method for producing hydrogen utilizing a sulfur based cycle that dramatically reduces the energy costs of the process by keeping the sulfuric compounds in gaseous phase throughout the cycle, thereby eliminating the energy costs necessary to convert the sulfuric oxide products from liquid to gas and back again. The invention further relates to method for producing hydrogen wherein oxygen is separated from sulfur dioxide with the use of absorbents.

BACKGROUND OF THE INVENTION

The production of hydrogen from thermochemical cycles is a science that has been evolving over the past thirty years. Several sulfur based thermochemical cycles that incorporate sulfuric acid decomposition are now known in the art, such as a Sulfur-Iodine cycle, a Hybrid Sulfur cycle, and a Sulfur-Bromide cycle. Starting back in the mid-70's, a process using sulfuric acid was developed by Westinghouse (Pittsburgh, Pa.), hereinafter the Westinghouse Sulfur Process. This process used thermal energy from a nuclear High Temperature Gas Cooled Reactor (HTGR) such as the Pebble Bed Modular Reactor (PBMR) for the decomposition of sulfuric acid or sulfur trioxide to oxygen, water and sulfur dioxide at elevated temperatures. The sulfur dioxide released during the decomposition is absorbed in water at about room temperature and sent to an electrolyzer. The sulfur dioxide and water is then electrolyzed to hydrogen and sulfuric acid in liquid form or sulfur trioxide in liquid form.

A more detailed view of the prior art is shown in prior art FIG. 1. As shown in the first step under reference number 2, the process forms sulfur dioxide through decomposition of sulfuric acid at elevated temperatures. This is called an oxygen generation step. The thermal energy required for this step is generally heat at a temperature above 600° C., preferably in the range of about 700 to 1100° C. The thermal energy is provided by any generator able to produce heat at that temperature level.

The reaction for sulfuric acid decomposition and oxygen generation in prior art FIG. 1 is:

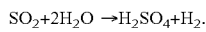

This step is often carried out in concert with a High Temperature Gas Cooled Reactor (HTGR) such as a PBMR to supply heat to the process. Various methods are employed to transfer the heat from the nuclear reactor loop to the decomposition reactor. One approach would be to use a bed of alumina or zirconia heat spheres with a catalytic surface that is heated with hot gas from an intermediate loop that is in turn heated by the reactor loop. The catalyst is employed to make the decomposition reaction proceed more quickly to the equilibrium value predicted for the temperature.

The sulfur dioxide is cooled in a vaporizer in second step, reference number 4. The vaporizer cools the sulfur dioxide in a heat exchanger, converting it from gas to liquid. Thereafter, in reference number 6, residual sulfur dioxide is absorbed in a counter current flow of water at a temperature above 40° F. to remove $SO_2$ from the $O_2$. This is referred to as the oxygen recovery step. The system generally operates under increased pressures of about 200 to 1100 psi. In other methods, the pressure of the system in step 3 is increased to between 1450 and 1700 psi, thereby allowing the sulfur dioxide to dissolve in water at higher temperatures or condense as a separate phase.

The sulfur dioxide in water is moved to a hydrogen production chamber where hydrogen is produced in a lower temperature step, reference number 8. The hydrogen production chamber is often an electrolyzer, wherein the energy for the reaction is an electrical current. In this circumstance, direct current electricity of between about 0.17 and 1.00 volt is added to the electrolyzer to react the sulfur dioxide and thereby forming aqueous sulfuric acid and hydrogen.

The reaction for the hydrogen producing step in prior art FIG. 1 is:

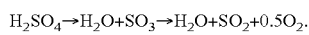

The electrolysis step is generally performed at temperatures of about 20 to 200° C. The current density is about 200 ma/sq.cm at about 60° C. By design, electrolysis processes do not present spark sources. The temperatures of the electrolysis step are not potential ignition sources for the produced hydrogen.

The aqueous sulfuric acid by-product of the hydrogen production step then re-enters the vaporizer in reference number 10. The vaporizer must vaporize the sulfuric acid, thereby converting it from liquid to gas, for the cycle to be complete. The vaporized gaseous sulfuric acid is thereafter fed back into the oxygen generation system of 2, repeating the cycle.

Another hydrogen production process that has been in existence for years is a Sulfur-Iodine process by General Atomics. The General Atomics process utilizes iodine and sulfur dioxide to produce sulfuric acid, which is then decomposed to oxygen, water and sulfur dioxide. The iodine process generally uses high temperature thermal energy from a nuclear reactor (~1000° C.) for the decomposition of sulfuric acid. The process is continually repeated in the aim of producing intermediate HI by-products from the reaction. The process produces hydrogen from the intermediate HI products of the sulfuric acid decomposition by reacting them under elevated temperatures. This hydrogen producing step is typically done at about 400° C.

The above processes, however, include significant energy requirements in that the sulfuric compounds utilized in the process require shifts in their physical state, namely from liquid to gas. In fact, the vaporizer is utilized twice in order to convert the physical state of the sulfuric compounds, reference steps 4 and 10. This not only increases the energy level required to perform the process, but reduces the lifespan of the catalyst during the decomposition procedure.

Thus, there continually remains a need to reduce the costs and increase safety levels of hydrogen production processes, especially those wherein a nuclear power plant provides the thermal energy for the process.

SUMMARY OF THE INVENTION

Accordingly, an object of the present invention is to provide a method for hydrogen production using sulfur compounds, wherein the sulfur compounds are in a gaseous state throughout the method, including the steps of decomposing gaseous $SO_3$ into gaseous $SO_2$ and gaseous $O_2$, separating the $SO_2$ from the $O_2$, and oxidizing the $SO_2$ with gaseous $H_2O$ to form gaseous $SO_3$ and gaseous $H_2$ It is a further object of the present invention to provide a method for hydrogen production using sulfur compounds, wherein the sulfur compounds are in a gaseous state throughout the method, including the steps of decomposing gaseous $SO_3$ into gaseous $SO_2$ and gaseous $O_2$, separating the $SO_2$ from the $O_2$, and oxidizing the $SO_2$ with liquid $H_2O$ to form gaseous $SO_3$ and gaseous $H_2$.

It is a further object of the present invention to provide a method for hydrogen production wherein the gaseous $SO_3$ is decomposed in a decomposition reactor under elevated temperatures of about 600-1000° C.

It is a further object of the present invention to provide a method for hydrogen production wherein the $SO_2$ is separated from the $O_2$ in one or a multiplicity of absorption tanks.

It is a further object of the present invention to provide a method for hydrogen production wherein the entire method operates under moderate pressure to maintain a $SO_2/SO_3$ stream as gas.

It is a further object of the present invention to provide a method for hydrogen production wherein the $SO_2$ is oxidized to $SO_3$ in an electrolyzer using water or steam as a source of $H_2$ and $O_2$ and transporting the ions across a ion exchange membrane which provides separation of the water decomposition and $SO_2$ oxidation processes.

DETAILED DESCRIPTION OF THE PREFERRED EMBODIMENTS

Figure 1:
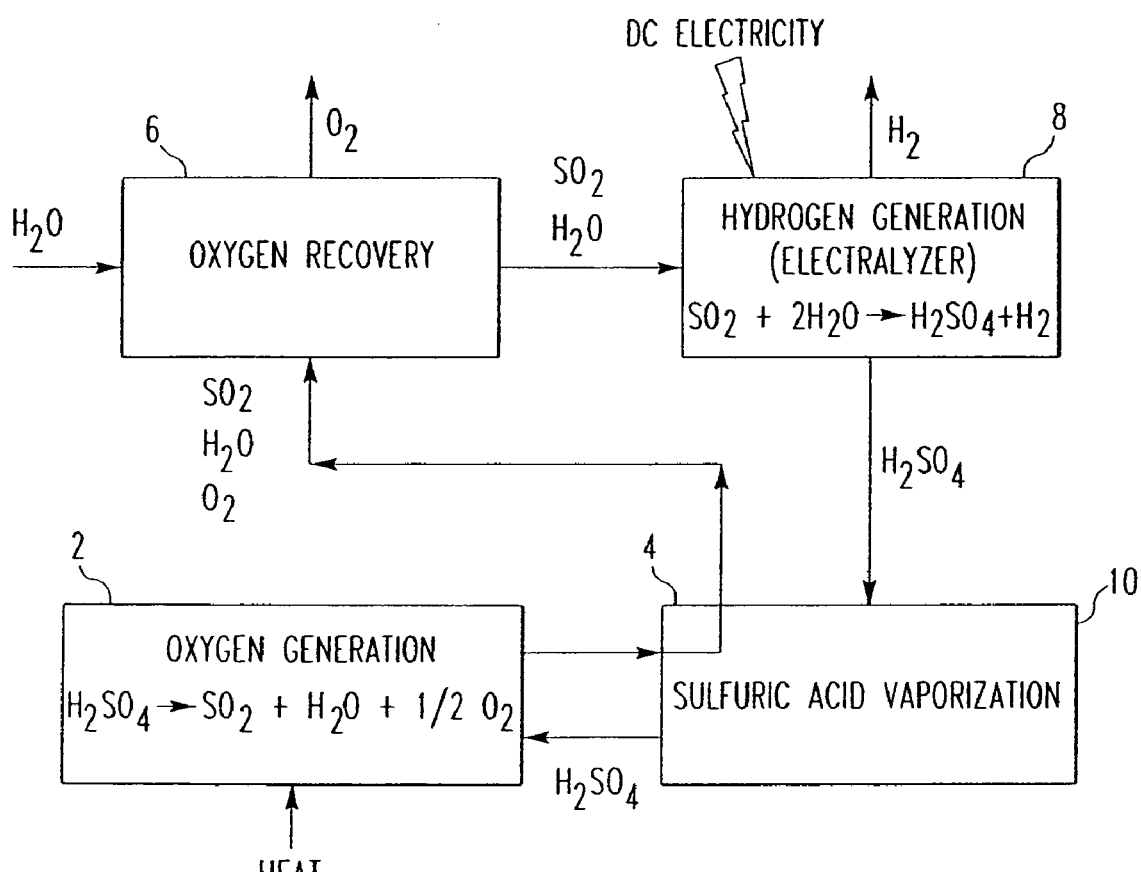
FIG. 1 is a process flow diagram of a prior art hydrogen production process.
Figure 2:
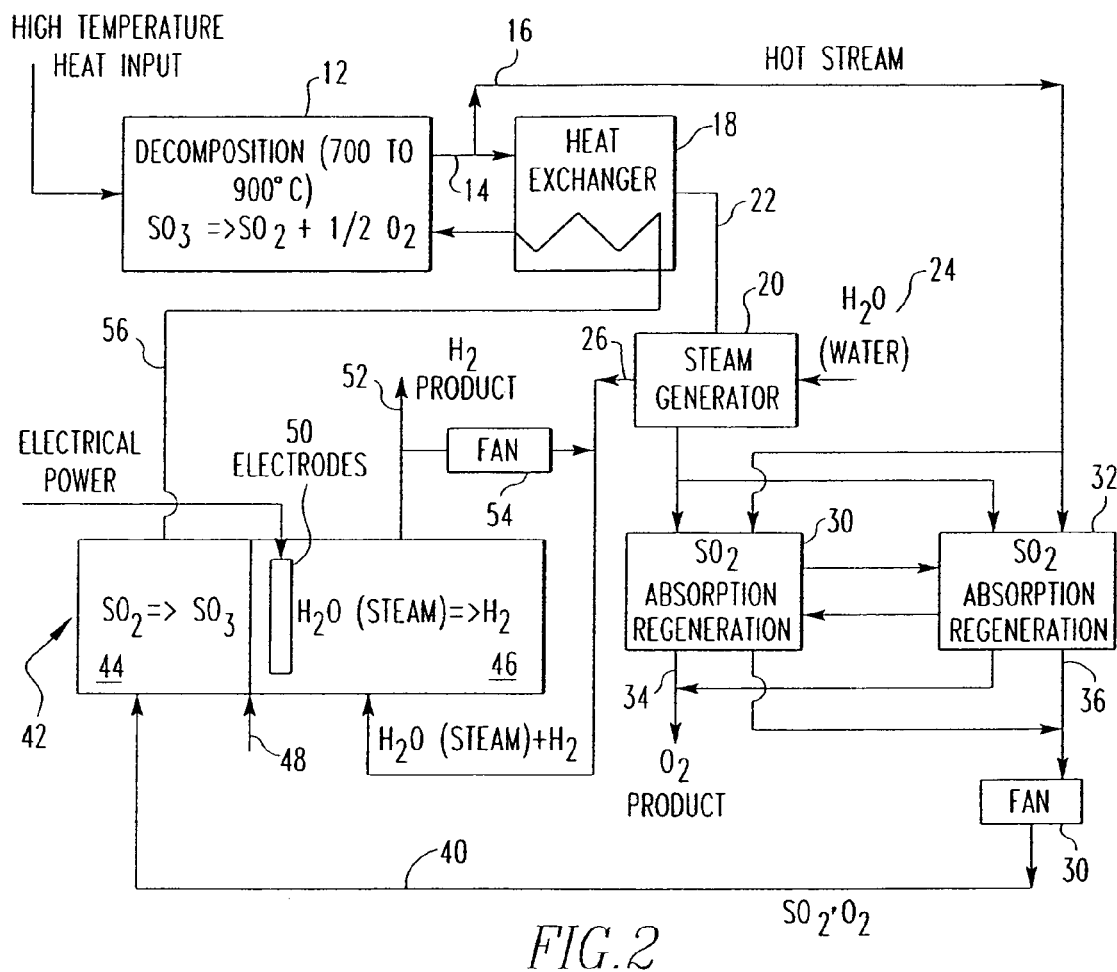
FIG. 2 is a process flow diagram of a gas phase $SO_3/SO_2/H_2O$ electrolyzer process.

One embodiment of a hydrogen producing sulfur cycle utilizing the oxidation of sulfur dioxide to sulfur trioxide in their gaseous phases is shown in FIG. 2. Sulfur trioxide ($SO_3$) is decomposed under elevated temperatures to sulfur dioxide ($SO_2$) and oxygen ($O_2$), under the reaction $SO_3 \rightarrow SO_2 + \frac{1}{2} O_2$, in a decomposition reactor as shown in reference number 12. Pressure for this step is kept at normal or slightly elevated pressures such that the sulfuric oxides stay in a gaseous state.

The thermal energy required for this step is generally heat in a temperature range of about 600 and 1000° C., preferably in the range of about 700 to 900° C. The thermal energy may be provided by a heat source, for example, a nuclear reactor. In additional embodiments, however, any other sources known in the art for thermal energy production in excess of 600° C. may be used. For example, generators that utilize fossil fuels such as coal or oil may be used to derive thermal energy to decompose the sulfur trioxide. Similarly, gas or solar power may be used. Alternatively, a combination of two or more sources may be used.

The heat necessary for the decomposition of sulfur trioxide can be captured from a generator in a transfer of heat known in the art. This may also include alternately heating one cold decomposition reactor with energy from the generator while another hot reactor is used for SO3 decomposition. In alternative embodiments, however, a multiplicity of decomposition reactors may be heated by a single heat generator. In one preferred embodiment, helium is heated in a heat generator and sent to a first decomposition reactor to heat a bed of alumina or zirconia heat spheres with a catalytic surface, wherein the catalytic surface is employed to make the decomposition reaction proceed more quickly to the equilibrium value predicted for the temperature. The helium heats the first decomposition reactor up to a desired temperature, and then is moved to a colder, second decomposition reactor. In the now hot first reactor, sulfuric acid or sulfur trioxide is decomposed, gradually cooling the first reactor. Meanwhile, the helium, still heated, heats up the second decomposition reactor. Once the second decomposition reactor has been heated to the desired temperature, the hot helium is diverted back to the now cooled first decomposition reactor to reheat it. The sulfuric acid or sulfur trioxide steam is then diverted to the second decomposition reactor to be decomposed in the now heated second reactor. The cycle continues as the second decomposition reactor gradually cools while the first decomposition reactor reheats. The cycle can then repeat. In additional designs, more than two decomposition reactors may be used, the helium can be fed through a zeolite bed to remove residual sulfur oxide vapors, and/or other variances known in the art. Other decomposition reactor designs can be used including those indirectly heating the sulfuric acid or sulfur trioxide stream through a heat exchange tube.

Thus, in any of the above embodiments, helium is heated in or near the heat generator to a temperature of about 700-1000° C. and conveyed into the decomposition reactor, thereby providing the heat for the reaction. The helium can be conveyed into the decomposition reactor by any means known in the art, such as piping. The cooled helium is conveyed from the decomposition reactor back to the generator, thereby heating it up to the proper temperature before returning to the decomposition reactor again in a continued cycle. Other compounds other than helium may be used in the process, for example, molten salts or other gases. If other compounds are used, heat may be transferred from the generator helium to these compounds via a suitable heat exchanger.

Within the decomposition reactor, a catalyst is preferably utilized to facilitate the $SO_3 \rightarrow SO_2 + \frac{1}{2} O_2$ reaction within the preferred 600-1000° C. temperature range. The catalyst is employed to make the decomposition reaction proceed more quickly to the equilibrium value predicted for the temperature. Catalysis known in the art for decomposing sulfuric compounds include platinum, iron, vanadium, held by supports such as the oxides of zirconium, aluminum, titanium and combinations thereof, typically with one of the elements oxidized. For example, $Pt/ZrO_2$, $Pt/Al_2O_3$ and $Pt/TiO_2$ compounds may be used as catalysts. The catalysts may have varying surface areas under the spirit of the invention. Typically, with decompositions that use or form water, i.e., decomposition of sulfuric acid (into water+$SO_2$+oxygen,) the catalyst is quickly worn down. Essentially, the water vapor resultant from when the prior art feed of $H_2SO_4$ is vaporized quickly wears down the catalyst. However, under the present invention where the decomposition is entirety gaseous and does not use or create water, the life span of the catalyst improves dramatically.

After decomposition, the sulfuric dioxide, oxygen and any remnant sulfur trioxide that did not decompose exit the decomposition reactor as a heated stream into a conveying means 14, wherein the conveying means is any means known in the art such as insulated piping. At this point, fresh from the decomposition reactor, the gases are still heated to a temperature range of about 600-1000° C. In one embodiment of the invention, the heated exiting stream of gaseous compounds is split between conveying means 14 and conveying means 16. This can be achieved by two separate conveying means exiting the decomposition reactor or by one conveying means that splits into two, as shown in FIG. 2. The majority of the sulfur dioxide, oxygen and remnant sulfur trioxide is moved through conveying means 14 into heat exchanger 18. The gaseous compounds exiting the decomposition reactor are cooled in the heat exchanger by gaseous compounds exiting an electrolyzer as more fully explained below.

The sulfuric dioxide, oxygen and any remnant sulfur trioxide compounds are further cooled in steam generator 20 after being conveyed through conveying means 22. The compounds are moved into heat exchange relation with pumped in water 24 in steam generator 20, such that the compounds are cooled by the water and the water is heated by the compounds. Note that the water and compounds do not mix, they are only in heat exchange relation. The water is heated by the compounds enough to become steam, and exits the steam generator as steam through conveying means 26 in a gaseous state. Meanwhile, the compounds are cooled by the water to a temperature range between about 4 and 60° C., although this can vary somewhat within the spirit of the invention. Note that any other heat source may be used to produce all or any portion of the steam that is required for operation of the steam side of the electrolyzer 46.

The cooled compounds exit the steam generator through conveying means 28, pass through a valve, and thereafter move into absorption tanks 30 and 32. While the present embodiment below uses two absorption tanks, a greater number of tanks can be used under the method of the invention with minimal adjustments.

Within the absorption tanks, oxygen is separated from sulfur dioxide and any remnant sulfur trioxide. It is important to note that any process known in the art that separates oxygen from sulfur dioxide can be utilized in the hydrogen production method of the present invention. For example, a membrane system that separates $O_2$ and $SO_2$ and remnant $SO_3$ can be used.

The cooled $SO_2$, $SO_3$ and $O_2$ from the steam generator are conveyed to one of the multiplicity of absorption tanks, for example, tank 30, through a valve or valves. The valve is a typical valve known in the art, wherein adjustment of the valve can control the movement of the compounds from the steam generator into tank 30, tank 32, both tank 30 or 32, or neither. If a greater number of tanks are used, the valve can similarly control movement of the compounds to any combination of the tanks. Additional conveying means may be located after the valve to bring the compounds to the desired tanks.

Note that the use of valves is not a prerequisite of the invention. Any apparatus known in the art that conveys the gasses to the proper tank or tanks at the proper time may be used. Thus, other controlling means known in the art other than valves may be used to control the movement of the compounds to the desired absorption tanks.

Further connected to the multiplicity of absorption tanks through a second valve or other apparatus is conveying means 16. Conveying means 16 carries a 'hot stream' of $SO_2$, $O_2$ and $SO_3$ gases from the decomposition tank. The hot stream gases are conveyed directly from the decomposition tank to the absorption tank and therefore have not been cooled by heat exchanges in heat exchanger 18 or steam generator 20. Thus the temperature of these hot stream gases typically remains in the 600-1000° C. range. The hot stream gases are similarly connected to the absorption tanks through a valve, wherein the valve can be adjusted to control the movement of the hot stream into none, one, or a multiplicity of absorption tanks. Additional conveying means may be located after the valve to bring the compounds to the desired tanks. These means may alternatively be fully or partially common to those used with the cooled gasses. Further, other controlling means known in the art, aside from and in addition to valves, may be used to control the movement of the compounds to the desired absorption tanks.

The cooled sulfur dioxide and oxygen is exposed to a bed of absorbent within the absorption tanks, wherein the bed of absorbent is an absorbent known in the art for absorbing sulfur compounds such as molecular sieves, zeolites or activated carbon. The temperature of the absorbing tank during absorption is generally ambient temperature or slightly elevated, between about 10-50° C. The pressure of the absorbent tank is similarly atmospheric or slightly elevated. Under these conditions, the absorbent will generally absorb the $SO_2$ and remnant $SO_3$ while leaving the oxygen free to exit through outlet 34. Thus, the gases are separated.

When the absorbent is full to the point where further absorption of sulfur oxide compounds is inefficient, the absorbent is thereafter regenerated. To regenerate the absorbent, the particular absorbent tank holding the full absorbent is taken off-line, that is to say, the valve, valves or other apparatus is/are adjusted such that the cooled gases from heat generator 18 and steam generator 20 via conveying means 22 and 28 are no longer entering the tank. Instead the control valve/valves or other apparatus is/are adjusted such that the hot stream of gases from conveying means 16 enter the tank The hot stream releases the absorbed sulfur compounds from the absorbent, thereby 1) freeing the sulfur oxide gases to be conveyed through optional outlet 36, fan 38 and into conveying means 40, and 2) freeing the absorbent to absorb more sulfur oxide gasses once the absorption tank is cooled again. The gases exiting the off-line absorption tank will have some oxygen present from the oxygen that was present in the hot stream. However, the vast majority of the gases will be sulfur oxide gases, mainly $SO_2$.

Under the present method, the absorption tanks 30 and 32 function such that when one tank is absorbing sulfur oxide gasses, the other may be regenerating. The two absorption tanks may alternate back and forth such that when one is absorbing, the other is regenerating, and vice versa. Of course, if desired, both tanks can absorb or regenerate at the same time. Further, when more than two absorption tanks are utilized in the method, any combination of the tanks may be absorbing or regenerating at any one time. In further embodiments, gases can travel between the multiplicity of absorption tanks, and/or the varying conveying means could only connect to a single or less than the entire number of absorption tanks.

Each tank may have its own outlet 34 for exiting oxygen during the absorption phase, or the tanks may be aligned such that they share one outlet, or in the case of more than two absorption tanks, any combination thereof. Likewise, each tank may have its own sulfur oxide outlet 36 and/or fan 38, or they may share the same one in a common header, or in the case of more than two absorption tanks, any combination thereof.

In alternative embodiments, the oxygen of the of the cooled oxygen-sulfur dioxide-sulfur trioxide stream may be absorbed in an absorbent. Any oxygen absorbent known in the art, such as zeolites or molecular sieves can be used. In this embodiment, the oxygen is absorbed in the oxygen absorbent in at least one of the absorption tanks, and the remaining $SO_2$ and $SO_3$ is directed through fan 38 and into conveying means 40. The oxygen can then be released by taking the absorption tank off-line. The hot stream of gases or steam enters the absorption tank, heating the tank and releasing the oxygen to exit through outlet 34. This has the additional purpose of regenerating the absorbent such that it can begin to absorb oxygen again once the tank is cooled by the re-entry of the cooled gases. In this embodiment, like the previous embodiment, based on the control of the valve or valves, all or none of the multiplicity of absorption tanks can be absorbing or regenerating at any time, or any combination thereof.

After the substantial separation in the absorption tanks, a stream of sulfur dioxide and remnant $O_2$ and $SO_3$ is conveyed through conveying means 40 into a hydrogen production cell 42 for a hydrogen producing step. In the present embodiment, the hydrogen producing cell 42 is an electrolysis unit. The hydrogen producing step generally utilizes an electrical current to oxidize sulfuric dioxide into sulfuric trioxide while simultaneously reducing steam into $H_2$. As shown in hydrogen production cell 42, sulfuric dioxide is conveyed from conveying means 40 into a first side 44 of the cell, wherein side 44 includes an anode. On a second side 46 of cell 42, gaseous $H_2O$ is conveyed in from steam generator 16 through conveying means 26, wherein second side 46 contains a cathode. Between first side 44 and second side 46 is a hydrated ion transfer membrane 48. Hydrated ion transfer membrane 48 can be any hydrated ion transfer membrane known in the art, for example, Nafion (DuPont, Wilmington, Del.), a poly(perfluorosulfonic acid) ion exchange membrane.

An electrical current is provided through two electrodes 50 to the electrolysis unit 44. The source of the electrical power can come from any source that produces electrical power. Preferably, however, it would come from the same source that is producing the high temperate input to the decomposition reactor 12. In the present example, both the temperature input and the electrical input are provided by a nuclear reactor.

The temperature of the hydrogen producing cell during the electrolysis is typically room temperature or slightly elevated, for example, from about 20 to 200° C., preferably between about 40 and 150° C. The current density is above 200 ma/sq.cm at above 60° C. and preferably above 500 ma/sq. cm and above 80° C. The pressure is moderate, typically below 1000 psi. to avoid condensation of the $SO_2$ and $SO_3$.

Figure 3:
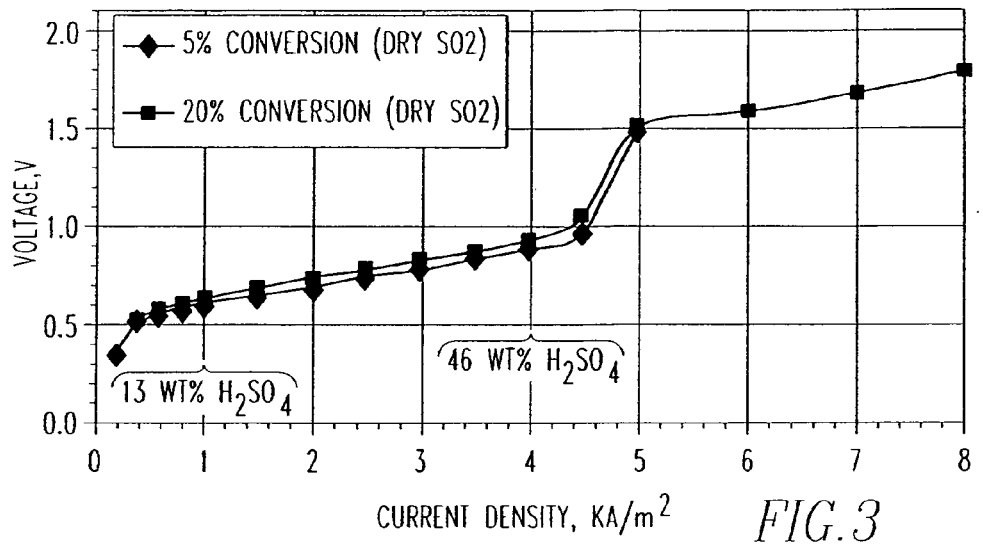
FIG. 3 is a graph of oxidation of $SO_2$ to $SO_3$ by voltage vs. current density.

When current is provided to the hydrogen producing cell, the steam inside 46 begins to move away from the cathode and toward the anode in side 44, diffusing across ion exchange membrane 48 in the process. The oxygen in the steam oxidizes sulfur dioxide into sulfur trioxide, thereby releasing hydrogen ions. The reaction for this step in side 44 is $SO_2+H_2O \rightarrow SO_3+2H^++2e^-$. As shown in FIG. 3, discussed below, the current used is high enough to make water diffusion the limiting factor in the oxidization of $SO_2$. Thus, at proper voltages and current densities, all of the steam that diffuses across the membrane is utilized to oxidize sulfur dioxide. If the voltage and current density is to low, the steam moves over too fast, and excess water would build up on side 44 and react with the $SO_3$ to form a condensed phase of $H_2SO_4$.

Once sulfur dioxide has been oxidized into sulfur trioxide and hydrogen ions have been released, the hydrogen ions diffuse back over membrane 48 toward the cathode in side 46. The hydrogen ions then react at the cathode where they are reduced to hydrogen gas in the reaction $2H^++2e^- \rightarrow H_2$. The hydrogen can then exit through outlet 52 to be captured and utilized as desired. Typically, the hydrogen would be purified by any means known in the art to eliminate possible contaminants, such as stray steam or sulfur gases.

While the hydrogen is exiting through outlet 52, a small part of the hydrogen product can be diverted through fan 54 back into conveying means 26. The hydrogen helps carry the steam from the steam generator to the hydrogen production cell, especially useful when the temperature of the conveying means drops below 100° C.

Figure 4:
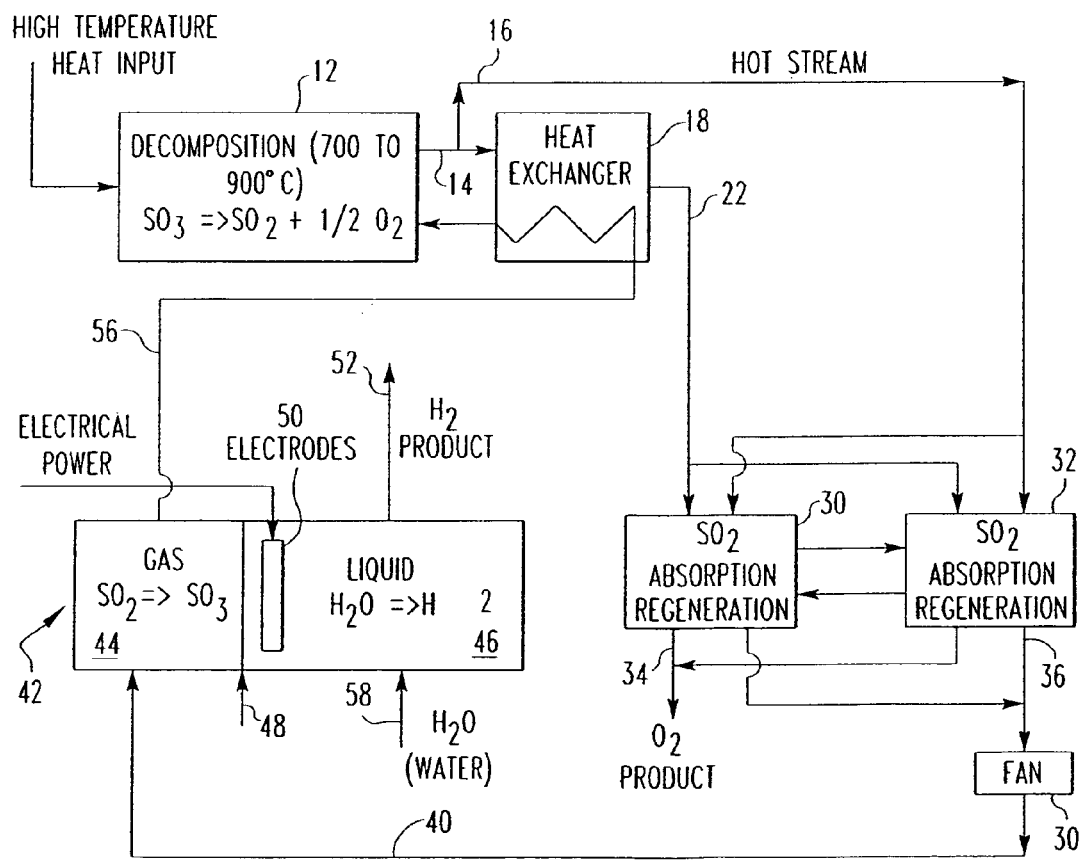
FIG. 4 is a process flow diagram of a gas phase $SO_3/SO_2$ and liquid phase $H_2O$ electrolyzer process.

The resultant $SO_3$ of the reaction on first side 44 exits through conveying means 56 to heat exchanger 18, wherein the $SO_3$ is heated and wherein gases from the decomposition reactor are cooled. Essentially, within heat exchanger 18, the $SO_3$ enters into a heat exchange relationship with the gases that exit decomposition reactor 12. The $SO_3$ gases prior to entry into the heat exchanger are at or close to ambient temperature. In contrast, the gases that exit the decomposition reactor are elevated, typically to about 600-1000° C. Thus, within the heat exchanger, the heated decomposition reactor gases are used to heat the $SO_3$ from the electrolyzer, while the $SO_3$ simultaneously cools the decomposition reactor gases. Note that the $SO_3$ does not mix with the decomposition reactor gases, only a heat exchange relationship is maintained. The decomposition tank gases, once cooled, are thereafter moved into the steam generator for further cooling or directly into the absorption tanks as shown in FIG. 4. The $SO_3$, now heated, is moved into the decomposition reactor for decomposition, completing the cycle. Note that supplementary heat may be added to the $SO_3$ stream from any heat source to make sure that the desired temperature of the $SO_3$ that enters the decomposition reactor is met.

The conversation of $SO_2$ to $SO_3$ as a function of voltage vs. current density is shown in FIG. 3. Note that the $SO_2$ oxidized by the steam will first convert to $SO_3$. If excess water is available, the $SO_3$ will then convert to $H_2SO_4$. Thus, the weight percent of $H_2SO_4$ shown in FIG. 3 is also a measure of the level of oxidation of the $SO_2$.

At the lower ends of voltage or current density, steam will diffuse across the membrane faster than the $SO_2$ will be converted to $SO_3$ which will then react to $H_2SO_4$, and the rate of $SO_2$ reaction is slower than the flow rate of $SO_2$ through the cell, leaving some $SO_2$ unreacted. As voltage and current density increase to above 5 kA/m$^2$, the diffusion of steam becomes a limiting factor. Thus, there is no excess water to form $H_2SO_4$ from the $SO_3$ that is formed by oxidizing the $SO_2$. In FIG. 3, a noticeable bump is seen at about 1 volt and 4.5 kA/m2 current density. This is generally the minimum level of voltage and/or current density that should be used for this process to guarantee that $H_2SO_4$, which would be in a liquid phase containing water, will not form.

At about 1.5 volts and 5 kA/m2 current density, the reaction is fast enough such that there is substantially no excess water. $SO_2$ oxidization can still be increased after this point, however, by further increasing the voltage and the current density. This is because, at this level, the increase tends to pull still more water through the membrane to react with more $SO_2$. Higher voltage may also enable a smaller electrolysis unit, since as the current density increases, less membrane area is required to achieve the same amount of $SO_2$ to $SO_3$ conversion.

An alternate embodiment of the method is shown in FIG. 4. In this embodiment, during the hydrogen producing step, liquid $H_2O$ is used instead of gaseous $H_2O$. This eliminates the need for a steam generator and any other liquid vaporization operations in the process, thereby reducing capital costs. Operation of the embodiment shown in FIG. 4 generally requires a small increase in voltage during the electrolysis step, about 0.5-0.8 v. However, this cost is more than offset by the costs saved through elimination of the steam generator. Further, as noted above, operation at these higher voltage levels may also result in a smaller electrolysis unit 42 due to the high current density that is achieved. The electrolysis step in this embodiment is similarly performed at temperatures of about 20 to 200° C., preferably between about 30 and 110° C. The current density is preferably above 500 ma/sq.cm at about 100° C.

It will be appreciated from the above that the pressures at each step of the above method is maintained at a moderate level in order to maintain the $SO_2$ and $SO_3$ in the cycle in a gaseous state such that a liquid species containing $SO_x$ is not formed.

While a full and complete description of the invention has been set forth in accordance with the dictates of the patent statutes, it should be understood that modifications can be resorted to without departing from the spirit hereof or the scope of the appended claims. For example, layout and placement of the individual steps of the method can vary widely within the spirit of the invention.

We claim:

1. A method for hydrogen production using sulfur compounds, wherein the sulfur compounds are in a gaseous state throughout the method, comprising the steps of:
    (a) decomposing gaseous $SO_3$ into gaseous $SO_2$ and gaseous $O_2$,
    (b) separating the $SO_2$ from the $O_2$, and
    (c) oxidizing the $SO_2$ with gaseous $H_2O$ in a hydrogen producing electrolyzer with electrolysis at a temperature of from about 20° C. to 200° C. to form gaseous $SO_3$ and gaseous $H_2$; by the following reactions at a temperature of from about 20° C. to 200° C.:

$$SO_2 + H_2O \rightarrow SO_3 + 2H^+ + 2e^-,$$

wherein, the $H^+$ diffuse through a hydrated ion transfer membrane, which $H^+$ is recovered as a $H_2$ product, by the reaction:

$$2H^+ + 2e^- \rightarrow H_2$$

leaving the $SO_3$ as a gas,
    and wherein the method further comprises the step of cooling a first portion of the $SO_2$ and $O_2$ produced in step (a) with water in a heat exchange relationship, and wherein the sulfur compounds are in a gaseous state throughout the method.

2. The method of claim 1, further comprising the step of using the $SO_3$ from step (c) as a substrate in step (a).

3. The method of claim 1, wherein the gaseous $SO_3$ is decomposed in step (a) in a decomposition reactor under elevated temperatures of about 600° C.-1000° C., and where, in step (c) the oxygen in the $H_2O$ oxidizes the $SO_2$ to $SO_3$ plus $2H^+$, and the membrane is a poly (perflurosulfuric acid) type ion exchange membrane.

4. The method of claim 3, wherein the decomposition reactor further includes a catalyst.

5. The method of claim 3, wherein an energy source for the decomposition reactor is selected from the groups consisting of: a nuclear reactor, a power plant, solar energy, and fossil fuels.

6. The method of claim 1, further comprising substituting the step of water cooling a first portion of the $SO_2$ and $O_2$ produced in step (a) with the step of cooling with the $SO_3$ formed in step (c) in a heat exchange relationship.

7. The method of claim 1, wherein the $SO_2$ is separated from the $O_2$ in step (b) in one or a multiplicity of absorption tanks.

8. The method of claim 7, wherein $SO_2$ is absorbed in absorbent in the absorption tank, wherein the $O_2$ is expelled through an outlet in the absorption tank.

9. The method of claim 8, wherein the $SO_2$ is released from the absorbent by heating the absorption tank with a second portion of the $SO_2$ and $O_2$ produced in step (a).

10. The method of claim 1, wherein the gaseous $H_2O$ from step (c) is produced in a steam generator.

11. The method of claim 1 wherein the electrolyzer operates at from about 20° C. to 200° C. and includes a hydrated ion transfer membrane that divides the electrolyzer into a first section and a second section.

12. The method of claim 11, wherein $SO_2$ is conveyed into the first section and gaseous $H_2O$ is conveyed into the second section.

13. The method of claim 11, wherein step (c) includes the step of applying a current to the cell.

14. The method of claim 1, where the electrolysis step is performed at voltages above about 1 volt.

15. The method of claim 1, wherein the electrolysis is performed at current densities above about 4.5 kA/m2.

16. The method of claim 1 wherein the pressure of the method is maintained such that liquid species containing $SO_x$ is not formed.

17. A method for hydrogen production using sulfur compounds, wherein the sulfur compounds are in a gaseous state throughout the method, comprising the steps of:
    (a) decomposing gaseous $SO_3$ into gaseous $SO_2$ and gaseous $O_2$,
    (b) separating the $SO_2$ from the $O_2$, and
    (c) oxidizing the $SO_2$ with liquid $H_2O$ in a hydrogen producing electrolyzer with electrolysis at a temperature of from about 20° C. to 200° C. to form gaseous $SO_3$ and gaseous $H_2$; by the following reactions at a temperature of from about 20° C. to 200° C.

$$SO_2 + H_2O \rightarrow SO_3 + 2H^+ + 2e^-,$$

wherein, the $H^+$ diffuse through a hydrated ion transfer membrane which is recovered as a $H_2$ product, by the reaction:

$$2H^+ + 2e^- \rightarrow H_2$$

leaving the $SO_3$ as a gas,
    and wherein the sulfur compounds are in a gaseous state throughout the method.

18. The method of claim 17, further comprising the step of using the $SO_3$ from step (c) as a substrate in step (a).

19. The method of claim 17, where, in step (c) the oxygen in the $H_2O$ oxidizes the $SO_2$ to $SO_3$ plus $2H^+$, and the membrane is a poly (perfluorosulfonic acid) type ion exchange membrane.

20. The method of claim 17 wherein the pressure of the method is maintained such that a liquid species containing $SO_x$ is not formed.

21. The method of claim 17, further comprising the step of cooling a first portion of the $SO_2$ and $O_2$ produced in step (a) with water in a heat exchange relationship, and the electrolyzer in step (c) operates at from about 20° C. to 200° C. and includes a hydrated ion transfer membrane that divides the electrolyzer into a first section and a second section.

* * * * *